United States Patent
Kishi et al.

(10) Patent No.: US 6,563,690 B2
(45) Date of Patent: May 13, 2003

(54) MULTILAYER CERAMIC CAPACITOR AND METHOD FOR THE MANUFACTURE THEREOF

(75) Inventors: Hiroshi Kishi, Tokyo (JP); Hirokazu Chazono, Tokyo (JP); Hisamitsu Shizuno, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 48 days.

(21) Appl. No.: 09/785,065

(22) Filed: Feb. 15, 2001

(65) Prior Publication Data

US 2002/0036882 A1 Mar. 28, 2002

(30) Foreign Application Priority Data

Feb. 16, 2000 (JP) ........................................ 2000-037539

(51) Int. Cl.[7] .............................. H01G 4/20; H01G 2/20
(52) U.S. Cl. ..................... 361/312; 361/308.1; 361/305
(58) Field of Search ........................... 361/301.3, 301.4, 361/303–305, 311–313, 320, 321.1–321.5

(56) References Cited

U.S. PATENT DOCUMENTS

| | | | | |
|---|---|---|---|---|
| 4,241,378 A | * | 12/1980 | Dorrian | 264/615 |
| 5,812,363 A | * | 9/1998 | Kuroda et al. | 361/306.3 |
| 6,078,494 A | * | 6/2000 | Hansen | 361/321.5 |
| 6,134,098 A | * | 10/2000 | Kuroda et al. | 29/25.42 |
| 6,229,686 B1 | * | 5/2001 | Shimahara et al. | 361/311 |

* cited by examiner

Primary Examiner—Dean A. Reichard
Assistant Examiner—Eric W Thomas
(74) Attorney, Agent, or Firm—Katten Muchin Zavis Rosenman

(57) ABSTRACT

A multilayer ceramic capacitor includes a multilayer ceramic body having alternately stacked ceramic layers and internal electrodes, the ceramic layers containing therein an acceptor representing one or more metallic elements for facilitating a reoxidation process of the multilayer ceramic body, and a pair of external electrodes installed at two opposite sides of the multilayer ceramic body, wherein the acceptor concentration in the ceramic layers stacked at a central portion of the multilayer ceramic body is higher than that in the remaining ceramic layers of the multilayer ceramic body.

11 Claims, 4 Drawing Sheets

MULTILAYER CERAMIC CAPACITOR AND METHOD FOR THE MANUFACTURE THEREOF

FIELD OF THE INVENTION

The present invention relates to a multilayer ceramic capacitor and a method for the manufacture thereof; and, more particularly, to a multilayer ceramic capacitor having good electrical characteristics without a short failure between internal electrodes made of a base metal such as Ni or Cu, and a method for the manufacture thereof.

BACKGROUND OF THE INVENTION

There is shown in FIG. 1, a cross sectional view of a prior art multilayer ceramic capacitor. As shown, the multilayer ceramic capacitor includes a reoxidized ceramic body 10, a pair of external electrodes 12 installed at two opposite sides of the reoxidized ceramic body 10, a plurality of ceramic dielectric layers 16 stacked on top of another, and a plurality of internal electrodes 14 each of which is provided on top of said each ceramic dielectric layer 16.

The respective internal electrodes 14 and the ceramic dielectric layers 16 are alternately stacked as an integral body. Further, two internal electrodes 14 adjacent to each other are electrically connected to two corresponding external electrodes 12.

The ceramic dielectric layers 16 are made of, e.g., a barium titanate-based dielectric material, and the internal and the external electrodes 14, 12 are made of, e.g., a conductive paste. The conductive paste is obtained by mixing Ni or Cu metal powder as a major constituent with a ceramic powder having an identical composition as the ceramic dielectric layers 16, and sintering the mixture.

An exemplary process for forming the multilayer ceramic capacitor is described below.

First, the barium titanate-based ceramic powder is mixed with an organic binder and water to form a ceramic slurry. Thereafter, ceramic green sheets having a thin sheet shape are formed from the slurry by using, e.g., a doctor blade.

Then, internal electrode patterns made of the conductive paste are printed on the top surfaces of portions of the ceramic green sheets by using a screen print method and are dried, wherein the ceramic green sheets having the internal electrode patterns printed thereon are referred to as "printed ceramic green sheets", and the ceramic green sheets having no internal electrode patterns thereon are referred to as "bare ceramic green sheets". The conductive paste may be prepared by dispersing Ni metal powder into a mixture having an organic binder such as ethyl cellulose resin, unsaturated polyester resin or butyral resin, a solvent such as α-terpineol or toluene, and a vehicle containing a surfactant.

Next, the printed ceramic green sheets are stacked and then the bare ceramic green sheets are stacked against the outermost sheets of the stacked ceramic green sheets to serve as a protecting layer, thereby forming a laminated ceramic body. Subsequently, the laminated ceramic body is pressed in a direction in which the sheets are stacked, and diced into chip-shaped multilayered ceramic bodies.

Thereafter, the chip-shaped multilayered ceramic bodies are loaded into a furnace to undergo a firing process. The multilayered ceramic bodies are calcined in an oxidative atmosphere at a temperature of about 600° C. to remove the organic binder contained therein, and then in a non-oxidative atmosphere, e.g., a reductive and/or a neutral atmosphere, are heated at a higher temperature than about 1000° C. to sinter the ceramic green sheets and the internal electrode patterns incorporated therein.

After lowering the temperature of the furnace from about 1000° C. to about 600° C. and changing the non-oxidative atmosphere thereof to the oxidative atmosphere, the sintered ceramic bodies are reoxidized to form reoxidazed ceramic bodies. The reoxidization process is performed so as to improve the insulation of the ceramic layers which may have been deteriorated during the sintering process carried out in the non-oxidative atmosphere.

Finally, after the paste for the external electrodes is applied on two opposite sides of each of the reoxidized ceramic bodies, annealing is carried out on the reoxidized ceramic bodies to install the external electrodes thereon, thereby forming the multilayer ceramic capacitor.

In such a method for manufacturing the multilayer ceramic capacitor, while the reoxidization process is carried out in the sintered ceramic body, sufficient oxygen is not fed into a central portion(K) surrounded by a broken line(see FIG. 1) which may in turn hamper the ceramic layers within the central portion of the sintered ceramic body from being reoxidized sufficiently. This may deteriorate an insulation resistance("IR") of the ceramic layers within the central portion, to thereby cause an early failure of the multilayer ceramic capacitor.

In order to solve the above problem, attempts have been made to add an extra amount of the acceptor; however, such would lower the dielectric constant or the life time of the capacitor.

SUMMARY OF THE INVENTION

It is, therefore, an object of the present invention to provide a multilayer ceramic capacitor having a central portion capable of being easily oxidized during an oxidization process and a method for the manufacture thereof.

In accordance with one aspect of the present invention, there is provided a multilayer ceramic capacitor comprising:

a multilayer ceramic body including alternately stacked ceramic layers and internal electrodes, the ceramic layers having an acceptor therein, the acceptor representing one or more metallic elements for facilitating a reoxidation process of the multilayer ceramic body; and a pair of external electrodes installed at two opposite sides of the multilayer ceramic body, wherein the acceptor concentration in the ceramic layers stacked at a central portion of the multilayer ceramic body is higher than that in the remaining ceramic layers of the multilayer ceramic body.

In accordance with another aspect of the present invention, there is provided a method for manufacturing a multilayer ceramic capacitor comprising the steps of:

forming a laminated ceramic body, the laminated ceramic body including alternately stacked ceramic green sheets and internal electrodes;

sintering the laminated ceramic body in a non-oxidative atmosphere to form a sintered ceramic body; and reoxidizing the sintered ceramic body in an oxidative atmosphere to form a reoxidized ceramic body, wherein the ceramic green sheets have an acceptor therein, the acceptor representing one or more metallic elements for facilitating the reoxidizing step, and the acceptor concentration in the ceramic green sheets at a central portion of the laminated ceramic body is greater than that in the remaining ceramic green sheets of the laminated ceramic body.

In accordance with still another aspect of the present invention, there is provided a method for manufacturing a multilayer ceramic capacitor comprising the steps of:

forming a laminated ceramic body, the laminated ceramic body including alternately stacked ceramic green sheets and internal electrodes;

sintering the laminated ceramic body in a non-oxidative atmosphere to form a sintered ceramic body; and reoxidizing the sintered ceramic body in an oxidative atmosphere to form a reoxidized ceramic body, wherein the internal electrodes have an acceptor therein, the acceptor representing one or more metallic elements for facilitating the reoxidizing step, and the acceptor concentration in the internal electrodes at a central portion of the laminated ceramic body is greater than that in the remaining internal electrodes of the laminated ceramic body.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
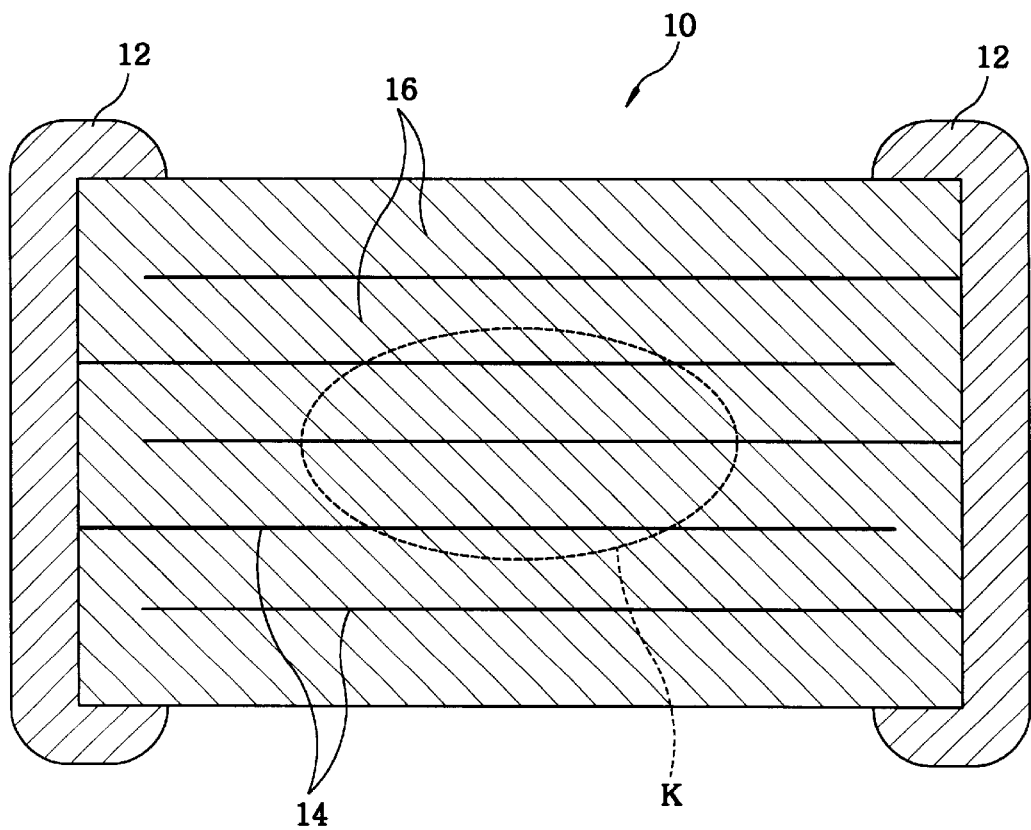
FIG. 1 shows a cross sectional view of a prior art multilayer ceramic capacitor.

The preferred embodiments of the present invention will now be described in detail by way of illustration based on the following Examples.

EXAMPLE 1

A pot mill was charged with alumina balls, 2.5 liters of water, and previously synthesized oxide materials including 1041.96 g (0.96 part by mole) of $BaCO_3$, 11.09 g (0.05 part by mole) of MgO, 5.70 g (0.01 part by mole) of SrO, 435.06 g (0.99 part by mole) of $TiO_2$ and 10.84 g (0.005 part by mole) of $Yb_2O_3$, and the resulting mixture was stirred and mixed for 15 hours to form a raw mixture.

The raw mixture was charged into a stainless steel pot and dried at 150° C. for 4 hours with a hot air dryer; and the dried raw mixture was pulverized into coarse particles. The resultant particles were then calcined in air at approximately 1200° C. for 2 hours using a tunnel furnace, thereby producing the first calcined powder(A).

Thereafter, 615.61 g of $BaCO_3$ was mixed with 384.39 g of $ZrO_2$ to have an identical mole part, and the resulting mixture was dried and pulverized. The pulverized particles were then calcined in air at approximately 1250° C. for 2 hours, thereby producing the second calcined powder(B).

Subsequently, 98 parts by mole (976.28 g) of the first calcined powder(A) and 2 parts by mole (23.85 g) of the second calcined powder(B) were mixed to form about 1000 g of basic components.

Further, 0.44 g (1 part by mole) of $Li_2O$, 70.99 g (80 parts by mole) of $SiO_2$, 11.10 g (3.8 parts by mole) of $BaCO_3$, 14.70 g (9.5 parts by mole) of $CaCO_3$, 3.40 g (5.7 parts by mole) of MgO were mixed. The reluctant mixture and 300 cc of alcohol are then charged into the polyethylene port, in which the mixture was stirred by using the alumina bolls for 10 hours. The stirred mixture was calcined in air at approximately 1000° C. for 2 hours.

Next, the calcined mixture and 300 cc of water were then charged into an alumina port, in which the charged mixture was pulverized by using alumina balls for 15 hours and the pulverized mixture was dried at 150° C. for 4 hours to obtain additive components.

Subsequently, 100 weight % (1000 g) of the basic components was mixed with 0.1 weight % (1 g) of $Al_2O_3$ and 0.1 weight % (1 g) of $Cr_2O_3$ both having an average particle diameter of 0.5 μm and a purity of 99% or higher, 2 weight % (20 g) of the additive components, and the metallic elements of Mn, V, Cr, Mo, Ni, Cu, Co, Fe within the range from 0 atm % to 1.5 atm % as listed for sample Nos. 112 in Table 1. The metallic elements were added as an acceptor. The term "acceptor" used herein represents one or more metallic elements for facilitating the reoxidation process of the ceramic layers. Such metallic elements include, but are not limited to, Mn, V, Cr, Mo, Ni, Cu, Co, and Fe. Further, the resultant mixture was mixed with 15 weight % of an organic binder which includes acrylic ester polymer, glycerin and a solution of condensed phosphate, and 50 weight % of water and then ground and mixed in a ball mill to form a slurry for forming ceramic layers.

Air contained in the slurry was then removed in a vacuum air-separator. The air removed slurry was transferred to a reverse roll coater to obtain a thin ceramic sheet. The thin ceramic sheet was continuously coated on a long polyester film and, simultaneously, was heated and dried at 100° C. 2T. The dried sheet was then cut into a plurality of 10 cm×10 cm ceramic green sheets having a thickness of approximately 5 μm.

The conductive paste for the internal electrodes was prepared by dissolving 10 g of nickel powder having an average particle size of 1.5 μm and 0.9 g of ethyl cellulose in 9.1 g of butyl carbitol and stirring the product for 10 hours with a stirrer. The resulting conductive paste was printed on one side of each the ceramic green sheet through a screen provided with 50 patterns, each being 14 mm in length and 7 mm in width and then dried.

Thereafter, 10 ceramic green sheets having an acceptor therein were stacked and, at each of the top and bottom sides of the stack thus formed, 50 ceramic green sheets containing no acceptor therein were stacked. Two neighboring ceramic green sheets were arranged in such a manner that the internal electrode patterns thereon are shifted by about a half of one pattern size along the lengthwise direction. Further, bare ceramic green sheets without having internal electrodes thereon were stacked on the top and under the bottom sides of the laminated body thus formed.

Next, the resulting laminated ceramic body was pressed with a vertical load of approximately 40 tons at a temperature of about 50° C. and then diced into a chip-shape, thereby obtaining 50 bodies of chip-shaped multilayered ceramic bodies.

Figure 2:
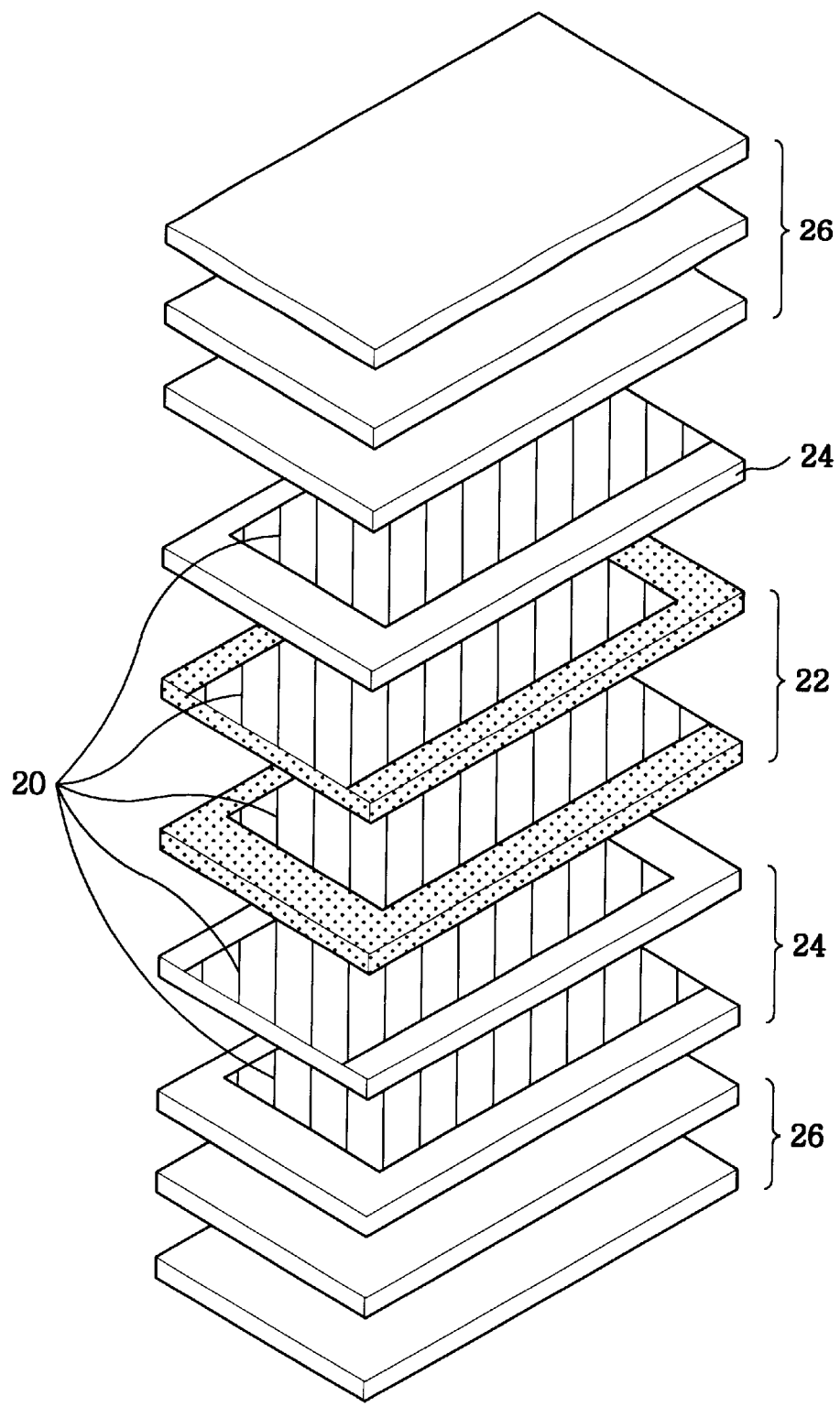
FIG. 2 presents a schematic exploded view of a multilayered ceramic body in accordance with a first preferred embodiment of the present invention.

Referring to FIG. 2, there is illustrated a schematic exploded view of a chip-shaped multilayered ceramic body thus obtained, wherein the reference numeral 20 represents the internal electrodes; 22, the ceramic green layers having an acceptor therein; 24, the ceramic green layers without containing an acceptor therein; and 26, the bare ceramic green layers without having internal electrodes and acceptors. In FIG. 2, only few ceramic green sheets are depicted for the sake at simplicity.

Subsequently, the multilayered ceramic bodies were loaded into a furnace to carry out a binder removing process. By raising the temperature of the furnace up to 600° C. at a ramping rate of 100° C./h in air, the binder removing process was carried out to remove the organic materials contained in the multilayered ceramic bodies.

Thereafter, the atmosphere of the furnace was changed into the reductive atmosphere by using the process gases of $H_2$ (2 volume %)+$N_2$ (98 volume %) and the binder-removed ceramic bodies were fired to obtain sintered ceramic bodies by increasing the temperature from 600° C. to a sintering temperature of 1,130° C. at a temperature ramp rate of 100° C./h and maintaining 1,130° C. (maximum temperature) for three hours.

Then, the temperature of the furnace was lowered to 600° C. at a rate of 100° C./h and the atmosphere of the furnace was changed to the air atmosphere(oxidative atmosphere). The furnace temperature was maintained at 600° C. for 30 minutes to perform a reoxidation process and thereafter cooled to the room temperature to obtain reoxidized ceramic bodies.

Subsequently, two end portions including the side surfaces of the reoxidized ceramic bodies where the internal electrodes were exposed were coated with a conductive paste including zinc, glass frit and a vehicle and then dried. The resultant ceramic bodies were baked in air at 550° C. for 15 minutes to form zinc electrode layers. Thereafter, copper layers were formed on the zinc electrode layers by means of an electroless plating method and then Pb—Sn solder layers were formed thereon by means of an electroplating method, obtaining a pair of external electrodes on each of the reoxided ceramic bodies.

Figure 3:
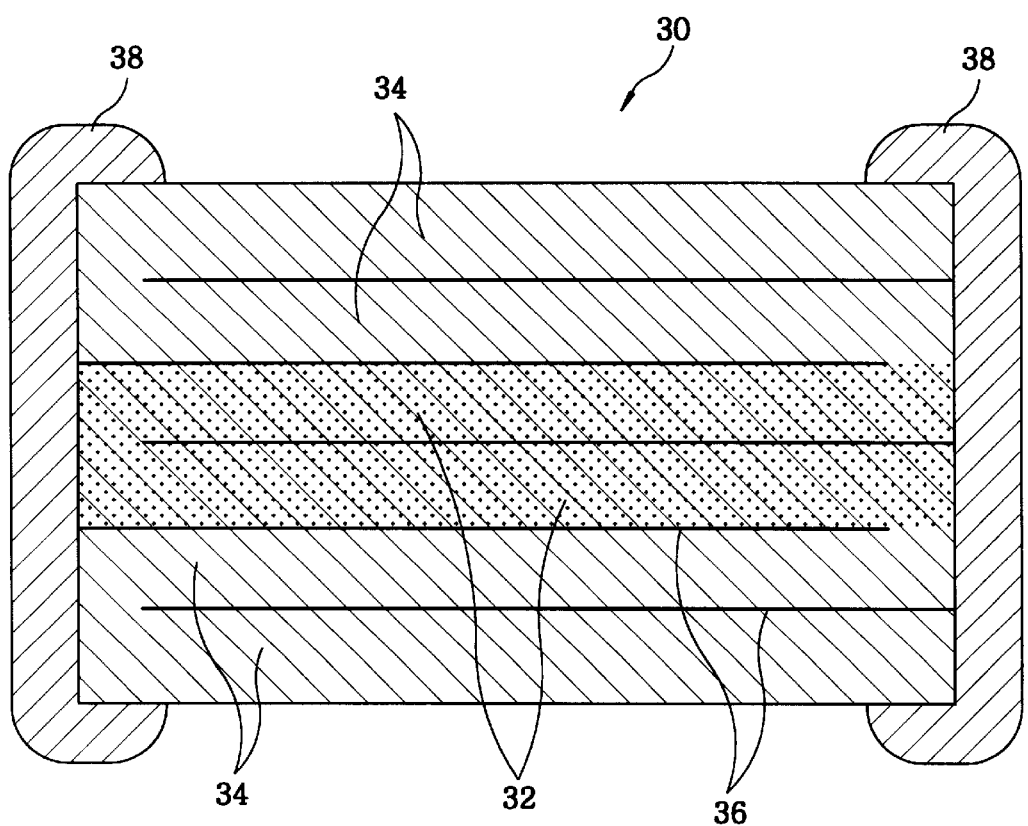
FIG. 3 describes a cross sectional view of a multilayer ceramic capacitor in accordance with the present invention.

Referring to FIG. 3, there is illustrated a multilayer ceramic capacitor 30 formed in a manner described above in accordance with a first preferred embodiment of the invention. The multilayer ceramic capacitor 30 includes ceramic layers 32 containing therein an acceptor, ceramic layers 34 having therein no acceptor species and positioned above and below the ceramic layers 32 having the acceptor species, internal electrodes 36 disposed between two neighboring ceramic layers, and a pair of external electrodes 38. In FIG. 3, only a few ceramic layers 32, 34 are depicted and the bare ceramic layers are omitted for simplicity. As illustrated, the ceramic layer 32 located at a central portion of the capacitor 30 contains acceptor species. It is preferable that the remaining ceramic layers, i.e., the ceramic layers 34 and the bare ceramic layers(not shown), do not contain acceptor species. A small amount of acceptor species may be contained in the remaining ceramic layers if required. However, the concentration of the acceptor species in the remaining ceramic layers should be lower than that in the center ceramic layers 32.

Short failure ratios, accelerated lifes and dielectric constants of the multilayer ceramic capacitors fabricated in the Example 1 were measured and the results(Sample Nos. 1–12) are shown in Table 1. The accelerated life was measured under the condition of 125° C. and 50 V.

EXAMPLE 2

Conductive pastes each containing one of the metallic elements of Mn, V, Cr, Mo, Ni, Cu, Co, Fe as an acceptor species were prepared. The concentrations of the acceptor species used in forming the conductive pastes were within the range from 0.1 atm % to 1.5 atm % as shown in Sample Nos. 13–23 of Table 1. The manufacturing process of the multilayer ceramic capacitors in this example was identical to that of the previous example, excepting that the acceptor species was contained not in the ceramic green sheets located at the center of the stack as in the previous example but in the internal electrode patterns thereon.

Figure 4:
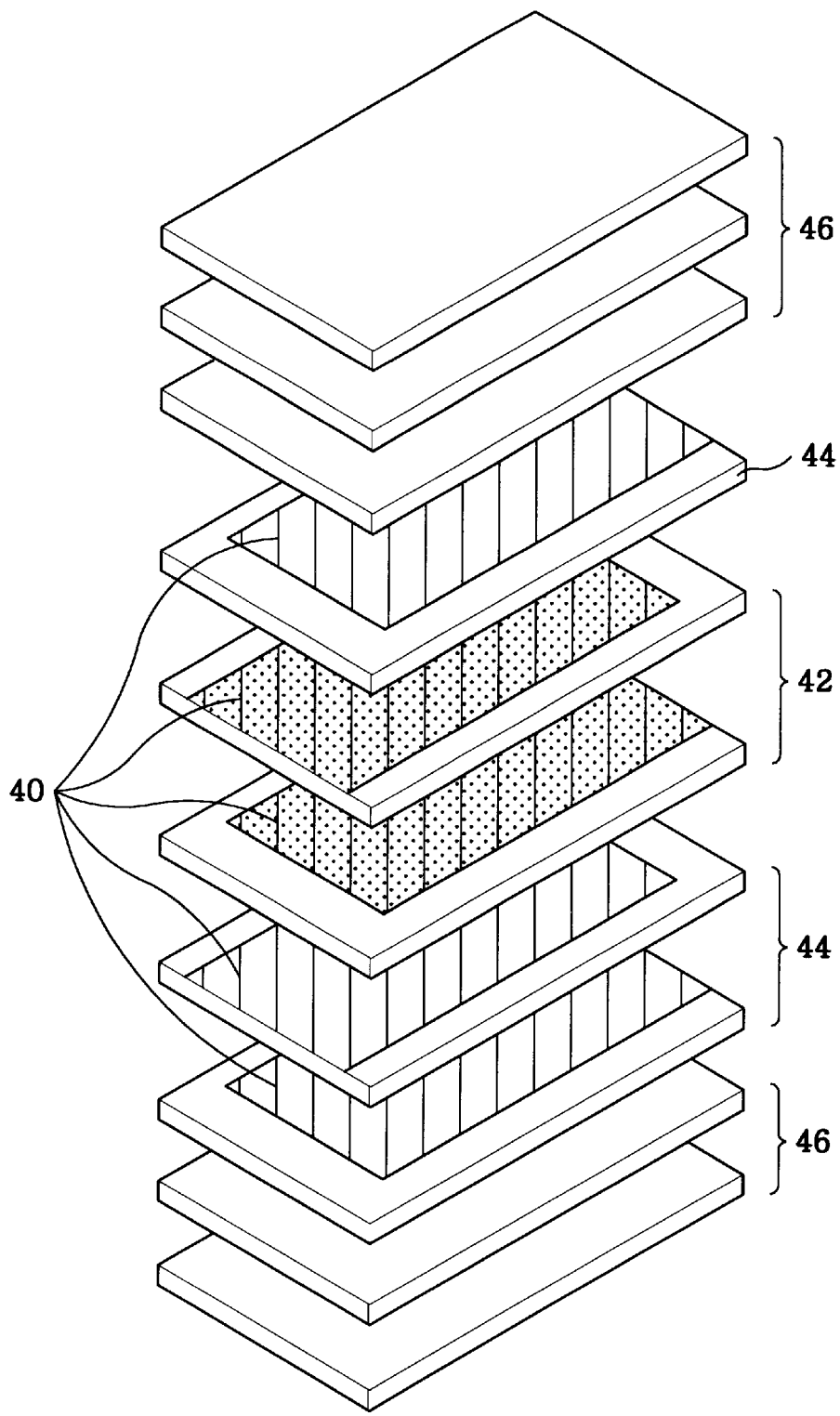
FIG. 4 offers a schematic exploded view of a multilayered ceramic body in accordance with a second preferred embodiment of the present invention.

Referring to FIG. 4, there is illustrated a schematic exploded view of a chip-shaped multilayered ceramic body obtained in this example. FIG. 4 corresponds to FIG. 2 of the previous example. As shown in FIG. 4, only the internal electrode patterns 40 on 10 ceramic layers 42 at the center of the multilayered ceramic body contained an acceptor species and none of the ceramic layers 42, 44 and 46 contained acceptor species. The acceptor species contained in the internal electrode patterns diffused out to their neighboring ceramic layers during the subsequent heat treating processes and resulted in the acceptor distribution as shown in FIG. 3.

As in Example 1, short failure ratios, accelerated lifes and dielectric constants of the finished multilayer ceramic capacitors were measured and their results are shown in Table 1(Sample Nos. 13–23).

TABLE 1

| No. | Acceptor (atm %) | | | | | | | | Short Failure Ratio (%) | Accelerated Life (sec) | Dielecric Constant ($\in_s$) |
| | Mn | V | Cr | Mo | Ni | Cu | Co | Fe | | | |
| --- | --- | --- | --- | --- | --- | --- | --- | --- | --- | --- | --- |
| 1 | 0 | 0 | 0 | 0 | 0 | 0 | 0 | 0 | 3 | 38,000 | 3,880 |
| 2 | 0.1 | 0 | 0 | 0 | 0 | 0 | 0 | 0 | 0 | 55,000 | 3,860 |
| 3 | 0.5 | 0 | 0 | 0 | 0 | 0 | 0 | 0 | 0 | 50,000 | 3,750 |
| 4 | 1 | 0 | 0 | 0 | 0 | 0 | 0 | 0 | 0 | 52,000 | 3,680 |
| 5 | 1.5 | 0 | 0 | 0 | 0 | 0 | 0 | 0 | 0 | 51,000 | 2,900 |
| 6 | 0 | 0.5 | 0 | 0 | 0 | 0 | 0 | 0 | 0 | 54,000 | 3,820 |
| 7 | 0 | 0 | 0.5 | 0 | 0 | 0 | 0 | 0 | 0 | 55,000 | 3,770 |
| 8 | 0 | 0 | 0 | 0.5 | 0 | 0 | 0 | 0 | 0 | 50,000 | 3,850 |
| 9 | 0 | 0 | 0 | 0 | 0.5 | 0 | 0 | 0 | 0 | 54,000 | 3,780 |
| 10 | 0 | 0 | 0 | 0 | 0 | 0.5 | 0 | 0 | 0 | 52,000 | 3,820 |
| 11 | 0 | 0 | 0 | 0 | 0 | 0 | 0.5 | 0 | 0 | 55,000 | 3,770 |
| 12 | 0 | 0 | 0 | 0 | 0 | 0 | 0 | 0.5 | 0 | 53,000 | 3,810 |
| 13 | 0.1 | 0 | 0 | 0 | 0 | 0 | 0 | 0 | 0 | 55,000 | 3,840 |
| 14 | 0.5 | 0 | 0 | 0 | 0 | 0 | 0 | 0 | 0 | 53,000 | 3,720 |
| 15 | 1 | 0 | 0 | 0 | 0 | 0 | 0 | 0 | 0 | 50,000 | 3,600 |
| 16 | 1.5 | 0 | 0 | 0 | 0 | 0 | 0 | 0 | 0 | 54,000 | 2,790 |

TABLE 1-continued

| | Acceptor (atm %) | | | | | | | Short Failure Ratio (%) | Accelerated Life (sec) | Dielecric Constant (∈s) |
|---|---|---|---|---|---|---|---|---|---|---|
| No. | Mn | V | Cr | Mo | Ni | Cu | Co | Fe | | | |
| 17 | 0 | 0.5 | 0 | 0 | 0 | 0 | 0 | 0 | 0 | 55,000 | 3,840 |
| 18 | 0 | 0 | 0.5 | 0 | 0 | 0 | 0 | 0 | 0 | 51,000 | 3,780 |
| 19 | 0 | 0 | 0 | 0.5 | 0 | 0 | 0 | 0 | 0 | 55,000 | 3,830 |
| 20 | 0 | 0 | 0 | 0 | 0.5 | 0 | 0 | 0 | 0 | 53,000 | 3,780 |
| 21 | 0 | 0 | 0 | 0 | 0 | 0.5 | 0 | 0 | 0 | 55,000 | 3,880 |
| 22 | 0 | 0 | 0 | 0 | 0 | 0 | 0.5 | 0 | 0 | 52,000 | 3,750 |
| 23 | 0 | 0 | 0 | 0 | 0 | 0 | 0 | 0.5 | 0 | 55,000 | 3,810 |

It can be seen from the results of Examples 1 and 2 that the short failure was prevented and the desirable accelerated life was achieved by making the concentration of the acceptor species in the ceramic layers positioned at the central portion of a multilayer ceramic capacitor higher than that in the remaining ceramic layers.

In such a multilayer ceramic capacitor, since a sufficient amount of oxygen can be supplied into the ceramic layers located at the central portion thereof due to the presence of the acceptor species thereat, it is possible to sufficiently reoxidize the central ceramic layers, which in turn improves the insulation resistance between the internal electrodes, thereby preventing short failures.

In addition, since instances of the short failures are minimized, it is possible to improve the yield of the multilayer ceramic capacitors and to lower the manufacturing cost thereof.

Moreover, in accordance with the present invention, it is possible to suppress the deterioration of characteristics due to excessive acceptor species, as well as possible to improve the entire balance of the electrical characteristics and the reliablility of the multilayer ceramic capacitor.

Although the invention has been shown and described with respect to the preferred embodiments, it will be understood by those skilled in the art that various changes and modifications may be made without departing from the spirit and scope of the invention as defined in the following claims.

What is claimed is:

1. A multilayer ceramic capacitor comprising: a multilayer ceramic body including alternately stacked ceramic layers and internal electrodes, the ceramic layers having an acceptor therein, the acceptor representing one or more metallic elements for facilitating a reoxidation process of the multilayer ceramic body,
    wherein concentration of the acceptor in the ceramic layers stacked at a central portion of the multilayer ceramic body is higher than that in the remaining ceramic layers of the multilayer ceramic body.

2. The multilayer ceramic capacitor of claim 1, wherein the internal electrodes are obtained by sintering a metal powder having Ni or Cu as a major component thereof.

3. The multilayer ceramic capacitor of claim 1, wherein the acceptor is one or more metallic elements selected from the group consisting of Mn, V, Cr, Mo, Ni, Cu, Co and Fe.

4. A method for manufacturing the multilayer ceramic capacitor of claim 1, comprising the steps of:

forming a laminated ceramic body, the laminated ceramic body including alternately stacked ceramic green sheets and internal electrode patterns;

sintering the laminated ceramic body in a non-oxidative atmosphere to form a sintered ceramic body; and reoxidizing the sintered ceramic body in an oxidative atmosphere to form a reoxidized ceramic body, wherein the ceramic green sheets have an acceptor therein and concentration of the acceptor in the ceramic green sheets at a central portion of the laminated ceramic body is greater than that in the remaining ceramic green sheets of the laminated ceramic body.

5. The method of claim 4, wherein the internal electrode patterns have an acceptor therein and concentration of the acceptor in the internal electrode patterns at a central portion of the laminated ceramic body is greater than that in the remaining internal electrode patterns of the laminated ceramic body.

6. The method of claim 5, wherein the internal electrode patterns are made of a conductive material having Ni or Cu as a major component thereof.

7. The method of claim 5, wherein the acceptor is one or more metallic elements selected from the group consisting of Mn, V, Cr, Mo, Ni, Cu, Co and Fe.

8. The method of claim 4, wherein the internal electrode patterns are made of a conductive material having Ni or Cu as a major component thereof.

9. The method of claim 4, wherein the acceptor is one or more metallic elements selected from the group consisting of Mn, V, Cr, Mo, Ni, Cu, Co and Fe.

10. The multilayer ceramic capacitor of claim 1, wherein the internal electrodes have an acceptor therein and concentration of the acceptor in the internal electrodes at a central portion of the multilayer ceramic body is greater than that in the remaining internal electrodes thereof.

11. The multilayer ceramic capacitor of claim 1, wherein the multilayer ceramic body is made by forming a laminated ceramic body including alternately stacked ceramic green sheets and internal electrode patterns, sintering the laminated ceramic body in a non-oxidative atmosphere to form a sintered ceramic body, and reoxidizing the sintered ceramic body in an oxidative atmosphere to form a reoxidized ceramic body.

* * * * *